US012178782B2

(12) United States Patent
Ray, II et al.

(10) Patent No.: US 12,178,782 B2
(45) **Date of Patent: *Dec. 31, 2024**

(54) DRUG POWDERIZATION WITHIN VIALS

(71) Applicant: CMPD Licensing, LLC, Conroe, TX (US)

(72) Inventors: Jay Richard Ray, II, Conroe, TX (US); Jasper Joseph Lovoi, III, Conroe, TX (US)

(73) Assignee: CMPD Licensing, LLC, Conroe, TX (US)

( * ) Notice: Subject to any disclaimer, the term of this patent is extended or adjusted under 35 U.S.C. 154(b) by 622 days.

This patent is subject to a terminal disclaimer.

(21) Appl. No.: 17/211,523

(22) Filed: Mar. 24, 2021

(65) Prior Publication Data

US 2022/0304894 A1 Sep. 29, 2022

(51) Int. Cl.
*A61J 1/20* (2006.01)
*A61J 3/02* (2006.01)

(52) U.S. Cl.
CPC ............ *A61J 1/2096* (2013.01); *A61J 1/201* (2015.05); *A61J 1/2037* (2015.05); *A61J 1/2051* (2015.05); *A61J 1/2089* (2013.01); *A61J 3/02* (2013.01)

(58) Field of Classification Search
CPC ..................................... A61J 1/20; A61J 3/02
See application file for complete search history.

(56) References Cited

U.S. PATENT DOCUMENTS

| | | | | |
|---|---|---|---|---|
| 2018/0360849 | A1* | 12/2018 | Cafiero | A61K 45/06 |
| 2022/0031607 | A1* | 2/2022 | Cho | A61K 47/40 |

OTHER PUBLICATIONS

Sullivan et al. (Mol. Pharm, (2015) 3; 12(8): 2665-2674).*
Bansal (Pharmaceutical Technology (2002).*
Patel et al. J. of Pharmaceutical Sciences (2017).*
Patel et al. (j. of Pharmaceutical Science (2017) 106; 1706-1721.*
Butreddy et al. AAPS PharmSciTech (2020); 21 252.*

* cited by examiner

*Primary Examiner* — Shirley V Gembeh
(74) *Attorney, Agent, or Firm* — Akerman LLP

(57) ABSTRACT

A method of powderizing a dry cake pharmaceutical drug product for injection within a vial may include securing a vial containing a dry cake pharmaceutical drug product for injection to a shaker device and powderizing the dry cake pharmaceutical drug product within the vial by shaking the vial with the shaker device operated at between about 100 to about 5000 cycles per minute for between about 10 minutes and about 1 hour.

17 Claims, 5 Drawing Sheets

| Size (µm) | % Volume In | Size (µm) | % Volume In | Size (µm) | % Volume In |
|---|---|---|---|---|---|
| 0.166 | 0.00 | 2.75 | 0.30 | 45.6 | 2.00 |
| 0.188 | 0.00 | 3.12 | 0.68 | 51.8 | 0.93 |
| 0.214 | 0.00 | 3.55 | 1.14 | 58.9 | 0.00 |
| 0.243 | 0.00 | 4.03 | 1.62 | 66.9 | 0.00 |
| 0.276 | 0.00 | 4.58 | 2.11 | 76.0 | 0.00 |
| 0.314 | 0.00 | 5.21 | 2.63 | 86.4 | 0.00 |
| 0.357 | 0.00 | 5.92 | 3.23 | 98.1 | 0.00 |
| 0.405 | 0.00 | 6.72 | 3.93 | 111 | 0.00 |
| 0.460 | 0.00 | 7.64 | 4.69 | 127 | 0.00 |
| 0.523 | 0.00 | 8.68 | 5.42 | 144 | 0.00 |
| 0.594 | 0.00 | 9.86 | 6.04 | 163 | 0.00 |
| 0.675 | 0.00 | 11.2 | 6.51 | 186 | 0.00 |
| 0.767 | 0.00 | 12.7 | 6.82 | 211 | 0.00 |
| 0.872 | 0.00 | 14.5 | 6.98 | 240 | 0.00 |
| 0.991 | 0.00 | 16.4 | 7.00 | 272 | 0.00 |
| 1.13 | 0.00 | 18.7 | 6.90 | 310 | 0.00 |
| 1.28 | 0.00 | 21.2 | 6.68 | 352 | 0.00 |
| 1.45 | 0.00 | 24.1 | 6.32 | 400 | 0.00 |
| 1.65 | 0.00 | 27.4 | 5.78 | 454 | 0.00 |
| 1.88 | 0.00 | 31.1 | 5.05 | 516 | 0.00 |
| 2.13 | 0.00 | 35.3 | 4.13 | 586 | 0.00 |
| 2.42 | 0.06 | 40.1 | 3.06 | 666 | 0.00 |

FIG. 4

| Size (μm) | % Volume Under | Size (μm) | % Volume Under | Size (μm) | % Volume Under |
|---|---|---|---|---|---|
| 0.166 | 0.00 | 2.75 | 0.06 | 45.6 | 97.06 |
| 0.188 | 0.00 | 3.12 | 0.36 | 51.8 | 99.06 |
| 0.214 | 0.00 | 3.55 | 1.04 | 58.9 | 100.00 |
| 0.243 | 0.00 | 4.03 | 2.18 | 66.9 | 100.00 |
| 0.276 | 0.00 | 4.58 | 3.80 | 76.0 | 100.00 |
| 0.314 | 0.00 | 5.21 | 5.91 | 86.4 | 100.00 |
| 0.357 | 0.00 | 5.92 | 8.54 | 98.1 | 100.00 |
| 0.405 | 0.00 | 6.72 | 11.77 | 111 | 100.00 |
| 0.460 | 0.00 | 7.64 | 15.70 | 127 | 100.00 |
| 0.523 | 0.00 | 8.68 | 20.38 | 144 | 100.00 |
| 0.594 | 0.00 | 9.86 | 25.80 | 163 | 100.00 |
| 0.675 | 0.00 | 11.2 | 31.84 | 186 | 100.00 |
| 0.767 | 0.00 | 12.7 | 38.35 | 211 | 100.00 |
| 0.872 | 0.00 | 14.5 | 45.17 | 240 | 100.00 |
| 0.991 | 0.00 | 16.4 | 52.15 | 272 | 100.00 |
| 1.13 | 0.00 | 18.7 | 59.15 | 310 | 100.00 |
| 1.28 | 0.00 | 21.2 | 66.05 | 352 | 100.00 |
| 1.45 | 0.00 | 24.1 | 72.73 | 400 | 100.00 |
| 1.65 | 0.00 | 27.4 | 79.05 | 454 | 100.00 |
| 1.88 | 0.00 | 31.1 | 84.83 | 516 | 100.00 |
| 2.13 | 0.00 | 35.3 | 89.88 | 586 | 100.00 |
| 2.42 | 0.00 | 40.1 | 94.00 | 666 | 100.00 |

FIG. 5

DRUG POWDERIZATION WITHIN VIALS

The present application is directed to systems, methods, and apparatuses for powderizing pharmaceuticals within vials.

BACKGROUND

Many pharmaceutical drugs are sold as dry compositions in vials for injection. These vials contain pharmaceutical drugs that are typically sealed while sterile to provide a sterile seal. Prior to use, a diluent or liquid carrier is injected into the vial to solubilize, disperse, or suspend the drug contents. The contents are subsequently drawn into a syringe for injection via various routes. Pharmaceutical drugs for injection that are moisture sensitive may be lyophilized, freeze dried, or subjected to various moisture removal techniques for sterile packaging in vials. The resulting dry pharmaceutical drug compositions may be packaged in the vials as one or more large crystal aggregates, referred to cakes. The solubilized or dispersed contents typically must be used immediately or within a short period of time following addition of diluent.

SUMMARY

In one aspect, a method of powderizing a dry cake pharmaceutical drug product for injection within a vial includes securing a vial containing a dry cake pharmaceutical drug product for injection to a shaker device and powderizing the dry cake pharmaceutical drug product within the vial by shaking the vial with the shaker device operated at between about 100 to about 5000 cycles per minute for between about 10 minutes and about 1 hour.

The method may further include maintaining a sterile seal under a cap of the vial during the powderization.

In one example, the shaker device includes a vortex mixer and the cycles per minute are revolutions per minute.

Securing the vial to the shaker device may include positioning the vial within a retainer housing. The retainer housing may include a container and positioning the vial within the retainer housing may include positioning the vial within an interior volume of the container. The vial may remain closed during powderization to maintain the sterile seal under a cap. The container may be removably attachable to an arm of the shaker device that outputs the shaking motion of the shaker device. In one example, the container includes a cap and the method includes securing the cap to the container before shaking the vial with the shaker device. The shaker device may be operated at between about 2500 and about 5000 cycles per minute for between about 10 minutes and about 20 minutes.

In one example, securing the vial to the shaker device comprises positioning the vial within a retainer housing. The retainer housing may include a bracket configured to receive and secure the vial to the shaker device.

In one example, the dry pharmaceutical drug product for injection is selected from amphotericin B, voriconazole, colistimethate, vancomycin, streptomycin, acyclovir, remdesivir, or ganciclovir.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIG. 4 is a table showing particle size representation of a powderized dry cake following a shaking operation according to various embodiments described herein; and FIG. 5 is a table showing particle size representations as percent of particles represented having particle sizes below listed sizes following a shaking operation according to various embodiments described herein.

DESCRIPTION

Figure 1A:
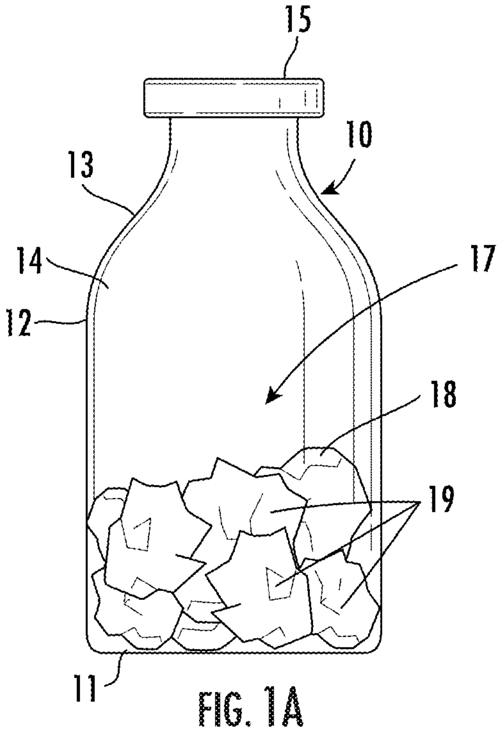
FIG. 1A illustrates a pharmaceutical drug for injection vial including dry cake pieces for powderization according to various embodiments described herein.
Figure 1B:
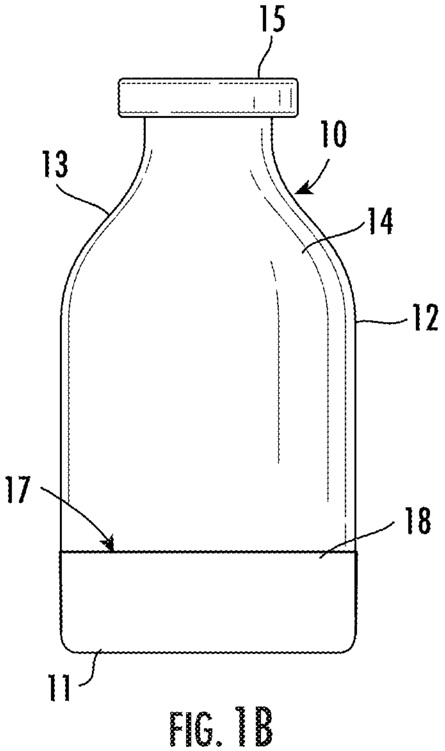
FIG. 1B illustrates a pharmaceutical drug for injection vial including a dry cake for powderization according to various embodiments described herein.

Many dry pharmaceutical drug compositions are sold in vials, such as vials for injection. With reference to FIGS. 1A & 1B, vials 10 may include a base 11, sidewall 12, and shoulders 13 defining an interior volume 14 for retaining the dry drug product 17. A cap 15 may be utilized to seal the interior volume 14. When manufactured for injection, these pharmaceuticals for injection are typically sealed within the vile 10 sterile. Some such vials 10 contain the dry drug product 17 pharmaceutical contents as a dry mass of large crystals, glass, rocks, powder aggregates, or agglomerates. Such large crystals, glass, rocks, and powder aggregates may be referred herein as dry cake 18, which may include smaller cake pieces 19 of relatively large rocks, glass, or crystals that have separated from a larger dry cake 18 or that where generated as separate particle aggregates, such as during a drying process.

Pharmaceuticals may be subjected to lyophilization drying process to provide stability for actives that lack moisture stability. Lyophilization is a drying process that includes freezing a drug product in solution, and then applying a vacuum to transition moisture content in the frozen drug product directly to vapor from the solid form by sublimation. This process generates stabilized dry drug product crystals and/or powder. The process may be performed in a vial or other container within which the drug product is to be distributed and a sterile seal under the cap may be used to prevent contamination of the lyophilized drug products. The lyophilization process is often applied to dry drug products for injection but may also be used for drying drug products formulated for other administration routes.

Lyophilization or other drying processes, such as freeze drying, may result in the dry drug product forming large particles or particle aggregates, referred to herein. With reference again to FIGS. 1A & 1B, these particle masses may conform to the contours of the vial 10 or other container, e.g., as depicted in FIG. 1B, as dry cake 18. Sometimes a cake 18 may breakup into cake pieces 19 or the drying or other manufacturing processes may result in formation of cake pieces 19 comprised of multiple large crystals, glass, rocks, particle aggregates, or particle agglomerates, e.g., depicted in FIG. 1A, wherein the particle or aggregate particle size of the cake pieces 19 may range from many hundreds of 100 microns to multiple centimeters in diameter (largest dimension). Medical personnel may be directed to reconstitute the dry cake 18, which may include multiple cake pieces 19, in diluent to formulate a solution that typically requires immediate administration. As those having skill in the art are aware, lyophilized dry cake 18 or cake pieces 19, such as that found in Voriconazole 200 mg vials for injection or Vancomycin 1 gram vials for injection, or very concentrated powder clump in a smaller glass vial, such as that found in Colistimethate 150 mg vials for injection or Streptomycin 1 gram vials for injection, are virtually impossible to extract from the glass vial without first introducing a liquid and reducing the same to a solution inside the vial itself prior to utilization. These vials are self-contained and are intended for the user to introduce a diluent via a syringe into the system, shake the vial, and then extract the resulting solution.

According to various embodiments described herein, dry drug products 17 in cake form may be physically reduced in size to powderize the dry cake 18 without opening the vial 10, which would break a sterile seal of the vial 10 and risk contamination of the dry drug product 17 therein. Example dry drug products 17 distributed in vials for injection in cake form suitable for application of the methodologies described herein include amphotericin, voriconazole, colistimethate, vancomycin, and streptomycin. Other injectable dry drug products 17 may also be packaged in vials in cake form.

According to various embodiments, a methodology for reducing/powderizing an injectable dry drug product 17 comprising dry cake 18 within a vial 10 may be utilized as to not require opening the vial 10 or introduction of foreign materials or structures into the vial 10. Performing the powderizing process within the vial 10 without introduction of additional material or mechanical crushing or grinding structures may be used to maintain a sterile seal placed on the vile 10 during manufacturing.

In one embodiment, the method may include subjecting a vial 10 including a dry drug product 17 for injection in cake form to vigorous shaking that causes the dry cake 18 or cake pieces 19 within the vial 10 to accelerate and subsequently and repeatedly collide within sides of the vial 10 and/or other dry cakes 18 to reduce to a powder version.

As introduced above, example dry drug products 17 distributed in vials 10 for injection in cake form suitable for application of the powderization methodologies described herein include amphotericin, voriconazole, colistimethate, vancomycin, and streptomycin. However, the above are merely examples as the methodologies described herein may similarly be applied to other dry drug products 17 for injection distributed in vials 10 or other containers.

Figure 2:
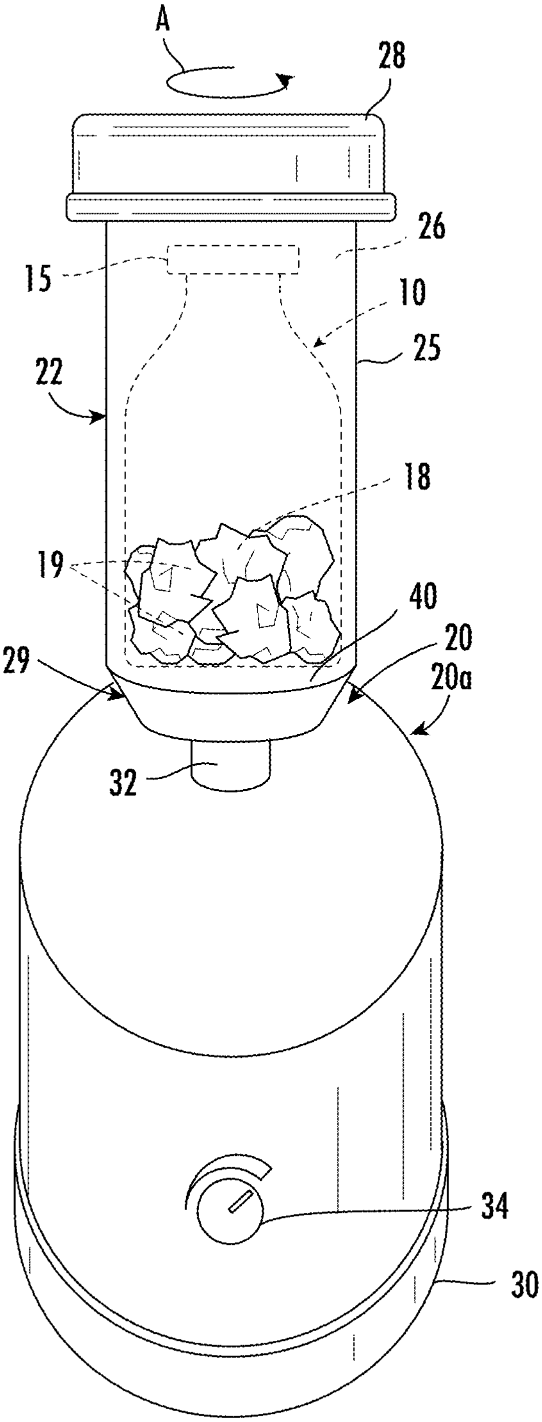
FIG. 2 illustrates a pharmaceutical drug for injection vial including dry cake pieces secured to a shaker according to various embodiments described herein.
Figure 3:
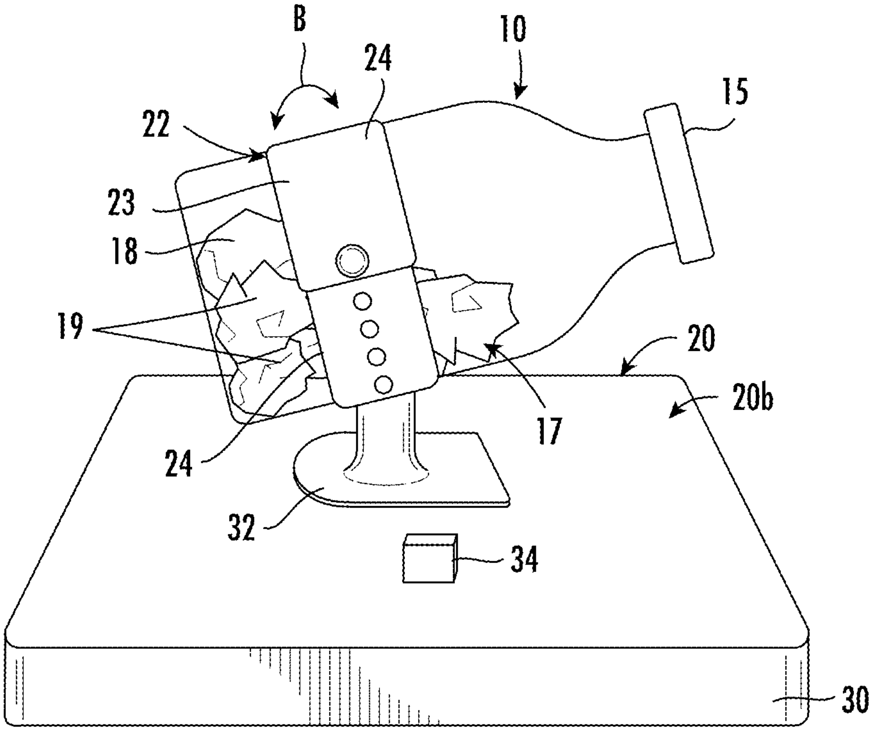
FIG. 3 illustrates a pharmaceutical drug for injection vial including dry cake pieces secured to a shaker according to various embodiments described herein.

With reference to FIGS. 2 & 3, the method may include utilizing a shaker device 20 to shake the contents of the vial 10. In various embodiments, the shaker device 20 may be configured to shake vials 10 longitudinally, laterally, rotationally (e.g., vortex), or combination thereof.

In one example, a shaker device 20 is or comprises a vortex shaker/mixer 20*a*, which may also be called a vortexer, such as a standard benchtop vortexer, such as a BV1000 Bench Mixter Vortexer, or a mini-benchtop vortexer, such as a BV101 Vornado™ Mini Vortex Mixer, each marketed by Benchmark Scientific, Sayreville, NJ. In one embodiment, the method may utilize a shaker device 20 comprising a vortex mixer 20*a*, such as a benchtop vortexer to powderize dry cake 19 contents of a vial 10 secured to the vortex mixer, e.g., as exemplified in FIG. 2.

In one example, a shaker device 20 is or operates similar to a paint shaker 20*b*, which may include a standard or hobby sized shaker device 20, such as a #410 or #411 Hobby Paint Shaker, marketed by Robart Mfg, Inc., St. Charles, IL, or an 1900A1 Classic Shaker XP, marketed by Radia, Plymouth, MN. In one embodiment, the method may include utilizing a shaker device 20 comprising a paint shaker 20*b* or similar, such as a hobby paint sized shaker or a larger paint shaker 20*b*. FIG. 3 illustrates an example of a vial 10 secured to a hobby paint sized paint shaker 20*b* for powderizing the dry cake 18 contents therein.

The vial 10 and its dry cake 18 contents may be subjected to shaking for any suitable amount of time required to powderize the dry cake 18 to obtain a powder version of the dry drug product 17 having a desired particle size or range. For example, the shaker device 20 may be set to operate within a range of about 1 and about 5000 cycles per minute (cpm), which as noted above may include longitudinal, lateral, vertical, vortex or other rotational movements, or combinations thereof. For example, a benchtop vortex mixer 20*a* may be set, e.g., using a power control knob 34, to between about 1 and about 5000 rotations per minute, such as between about 1000 and about 5000 rotations per minute.

In various embodiments, the operational settings of the shaker device 20 may vary based on one or more of the amount of dry cake 18 to be powderized, size of the dry cake pieces 19 making up the dry cake 18 to be powderized, particle size or range of dry drug product 17 powder desired, or adhesion or bond strength to which the crystal, glass, rock, and/or particles in the dry cake 18 are associated. In various embodiments, the method may include setting the shaker device 20 to operation for between about 2 minutes and about 1 hour at about 1 to about 5000 cpm, such as between about 1000 and about 5000 cpm, or between about 2500 and about 5000 cpm, which may be more specifically referred to as revolutions per minute for vortex mixer 19.

The method may include securing a vial 10 to the shaker device 20 for subsequent shaking to break-up the dry cake 18 drug product during operation of the shaker device 20.

In one embodiment, the method includes securing the vial 10 to the shaker device 20 via mating structures such as snaps or clips. In one example, the vial 10 may be snapped, clipped, or otherwise attached to a retainer housing 22 attached or attachable to the shaker device 20. For example, the vial 10 may be secured to or within a retainer housing 22 attached or attachable to the shaker device 20 that is configured to securely retain the vial 10. In one embodiment, the vial 10 may be secured to the shaker device 20 with a retainer housing 22 comprising a bracket 23, which may include a strap 24 (see, e.g., FIG. 3) or other attachment structure configured to secure the vial 10 with respect to the operative motion of the shaker device 20 as the vial 10 is shaken. For example, a bracket 23 attached or attachable to the shaker device 20 may be fitted around the vial 10 and secured to retain the vial 10. In one configuration, the bracket 23 may be flexible and/or adjustable to wrap around and secure vials 10 having various cross-section shapes and/or diameters. A buckle, clip, snap, or other attachment structure may be used to maintain the bracket 23 at a desired size to secure the vial 10. The bracket 23 may be elastomeric to stretch and apply pressure against the vial 10 as it is wrapped around or engages the vial 10. The bracket 23, such as a brace, may include elastomeric and/or compressible material that contact the vial 10 to apply pressure theregainst when the bracket 24 is fitted around or engaged with the vial 10 to secure the same. It will be appreciated that in some embodiments, multiple vials 10 may be secured to a shaker device 20 for powderizing the dry cake 18 contents. For example, a bracket 23 may be configured to secure multiple vials 10 at a time.

In the embodiment illustrated in FIG. 3, the shaker device 20 includes a base 30 having an arm 32 operable to be translated by a motor housed in the base 30 to shake the vial 10 laterally in a plane or within an arc, as generally indicated by arrow B. A power control knob 34 is provided to control output operations of the arm 32. A strap 24 attached or attachable to the arm 32 of the shaker device 20 is fitted around the vial 10, securing the vial 10 to the arm 32. The strap 24 may be adjustable to wrap around and secure vials 10 having various cross-section shapes and/or diameters. An attachment structure 36 such as a buckle, clips, or snaps may be used to maintain the strap 24 at a desired size to secure the vial 10. The strap 24 may include elastomeric to apply pressure to the secured vial 10. In the illustrated embodiment, the strap 24 does not apply pressure to the cap 15 and seal of the vial 10. The shaker device 20 may be operated at about 1 to about 5000 cpm, as described above and elsewhere herein, for a suitable amount of time to obtain the desired powder particle size or range. In other embodiments, the vial 10 may be secured to the arm 32 in an upright or other orientation.

As introduced above, in some embodiments, the vial 10 may be securely retained within a retainer housing 22 attached or attachable to the shaker device 20. The retainer housing 22 may include a bracket 23 (FIG. 3) configured to secure the vial 10 or a container 25 (FIG. 2) configured to receive the vial 10 within an interior volume 26 thereof. A bracket 23, for example, may include two or more arms or other structures configured to contact the vial 10. The arms or other structures may position above, below, and/or along one or more sidewall 12 of the vial 10, for example. In one embodiment, the bracket 23 comprises two half hemisphere braces that receive the vial 10 therebetween and which may be secured together to secure the vial 10. In one example, the braces may be lined with a foam, rubber, cushioning, or elastomeric material to compress against or provide cushioning for the vial 10.

In one example, a retainer housing 22 is dimensioned to tightly receive the vial 10 such that shaking does not result in significant movement or rattling of the vial 10 against sides or interfacing portions of the retainer housing 22. In one example, sidewall of the retainer housing 22 are dimensioned to correspond to that of an outer cross-section shape and/or dimension of the vial 10 to prevent rattling of the vial 10 against the sidewall of the retainer housing 22. In this or another example, upper and lower sides of the retainer housing 22 may be spaced apart a distance corresponding to a height of the vial 10 to prevent longitudinal excursions of the vial 10 within the retainer housing 22. In an above or another embodiment, the retainer housing 22 comprises a container 25 (see, e.g., FIG. 2) configured to receive and retain the vial 10 within its interior volume 26 and that is attached or attachable to the shaker device 20.

If the retainer housing 22 includes a container 25 having an interior volume 26 for receiving the vial 10 that is larger than the vial 10 such that the vial 10 may be tossed about within the interior volume 26 of the container 25 when subjected to shaking, the retainer housing 22 may include a fitting within the container 25 to prevent damage to the vial 10 or cap 15 of the vial 10 that could interfere with a sterile seal between the cap 15 and the vial 10. The fitting may be attached or attachable to the retainer housing 22. The fitting may be configured to be received within the container 25. In some embodiments, a fitting may include a plastic, foam, cushioning, elastomeric, or other materials. In some embodiments, a fitting may include a rigid material such as a rigid plastic or metal. Fittings may include upper, lower, and/or lateral fittings. Fittings may operate as spacers to occupy or setoff the vial 10 from interfacing surfaces of the retainer housing 22 within an available interior volume 26 with in the container 25 to limit excursion of the vial 10 within the container 25 during shaking.

In one example, the retainer housing 22 includes upper and/or lower fittings configured to longitudinally secure the vial 10 (along its height dimension) during shaking. The fitting may be attached to the retainer housing 22 or may be configured to be positioned within a container 25 of the retainer housing 22 to receive the vial 10 within its interior volume 26. Upper and lower fittings may be positioned at upper and lower sides of the vials 10. For example, an upper fitting may be positioned over the cap 15 or shoulder 13 of the vial 10. A lower fitting may be positioned under a base 11 of the vial 10. In one example, upper and/or lower fittings comprise interfacing portions configured to interface with upper and/or lower portions of the vial 10. The interfacing portions may include contours corresponding to that of the vial 10. In another embodiment, upper and/or lower fittings may include interfacing portions that are not contoured to correspond to that of the vial 10. For example, a retainer housing 22 may include an upper fitting comprising a block or plug that can be positioned over the vial 10 to longitudinally secure the vial 10. In a further example, an upper fitting comprises a foam or cushion block configured to be positioned over the vial 10 within the container 25. In some embodiments, the retainer housing 22 may include a plurality of fittings of different dimensions configured to secure different sized vials 10.

In one example, a lower fitting includes a recess dimensioned to correspond to that of a base 11 of the vial 10 to securely receive the vial 10 therein and prevent longitudinal movement of the vial 10 either alone or in combination with an upper fitting. In one embodiment, the recessed portion of the lower fitting may be defined by vertically extending side portions configured to extend around a portion of sidewall 12 of the vial 10 to securely space the same apart from sidewall 27 of the container 25. In this or another embodiment, an upper fitting may be used that position between an upper wall or cap 28 of the container 25 and the cap to prevent, either alone or in combination with a lower fitting, longitudinal movement of the vial 10 within the container 25 during shaking. An upper fitting may also include a recess dimensioned to correspond to that of the cap 15 or shoulder 13 of the vial 10. In one example, an upper fitting includes a recess into which the cap 13 may be received. The upper fitting may also include vertically extending side portions configured to extend around a portion of sidewall 12 of the vial 10 to securely space the same from the sidewall 27 of the container 25.

Additionally or alternatively, the upper fitting may include a shoulder restraint. A shoulder restraint may be configured to engage a shoulder 13 of the vial 10 to restrain longitudinal movement of the vial 10 during shaking. In various embodiments, a shoulder restraint may include a fixed or fixable collar, ledge, or other structure that engages the shoulder 13 of the vial 10 and restrains longitudinal movement. A shoulder restraint may be configured such that force is not applied to the cap of the vial 10 during shaking, e.g., by the cap striking or contacting the container 25 or a fitting.

In some embodiments, a retainer housing 22 may include on or more lateral fittings configured to laterally secure or protect the vial 10 within a container 25 of the retainer housing 22, e.g., via positioning or lodging between sidewall 12, 27 of the vial 10 and container 25, to prevent significant movement or rattling of the vial 10 against sidewall 27 of the container 25. In one example, sidewall 27 of the retainer housing 22 or container 25 thereof are dimensioned to correspond to that of an outer cross-section shape and/or dimension of the vial 10 to prevent rattling of the vial 10 against the sidewall 27 of the retainer housing 22 or container 25 thereof In this or another example, upper and lower sides of the retainer housing 22 may be spaced apart a distance corresponding to a height of the vial 10 to prevent longitudinal excursions of the vial 10 within the retainer housing 22 or container 25 thereof.

In one embodiment, the fitting includes a pocket dimensioned to receive the vial 10 within the pocket and securely retain the vial 10 from movement within the pocket. In one example, the pocket is dimensioned as a negative mold corresponding to one or more vials 10. The fitting may include multiple sections, such as top and bottom sections and/or right and left sections that may be secured together by clips, snaps, latches, press-fittings, or other attachment structures. In one example, the sections may be assembled together without attachment structures and be positioned within the container 25 or other retaining structure of the retainer housing 22. A container 25, for example, may be dimensioned to correspond with an outer cross-section dimension of the fitting that prevents the fitting from releasing the vial 10 during shaking. In one example, no fitting is used.

In another example, the vial 10 may be positioned loosely within a container 25 of a retainer housing 22 having interior dimensions larger than that of the vial 10 such that operation of the shaker device 20 causes the vial 10 to repeatedly strike interior sides of the container 25, halting acceleration of the vial 10 to cause the dry cake contents to collide with the sides of the container 25. The collisions with the sides of the container as well as with other pieces of the dry cake 18 contents may breakup the dry cake 18 and pieces 19 thereof to increase the number of dry cake pieces 19 within the vial 10 while simultaneously reducing the size of the dry cake pieces 19 to eventually produce a powder of desired particle size or range.

It will be appreciated that in some embodiments, multiple vials 10 may be received within a retainer housing 22. For example, a retainer housing 22 may be configured to secure multiple vials 10 at a time. As introduced above, a retainer housing 22 may comprise a container 25 configured to receive the vial 10 within its interior volume 26. The retainer housing 22 or container 25 thereof may be attached or attachable to the shaker device 20. For example, the retainer housing 22 may attach to the shaker device 20 via attachment structures 29 such a clamps, clips, mateable structures, such as threads, or other mating structures.

With specific reference to FIG. 2 illustrating an example shaker device 20 comprising a benchtop vortex mixer 20*a* and a retainer housing 22 attached to an arm 32 of the shaker device 20. In operation, the arm 32 is oscillated by the motor in a circular motion, generally indicated by arrow A.

The vortex mixer 20*a* includes a base 30, arm 32, and power control knob 34 to control motor output to the arm 32. The retainer housing 22 includes a container 25 configured to be attached to the arm 32. The container 25 includes a base 40, sidewall 27, and a cap 28 defining an interior volume 26 to receive the vial 10. In some embodiments, the cap 28 may be excluded.

The retainer housing 22 and/or the arm 32 may include an attachment structure 29 configured to attach the retainer housing 22 to the arm 32. In one embodiment, the attachment is permanent. For example, the arm 32 and retainer housing 22 may be integral, adhered with adhesive, or bolted. In one embodiment, the retainer housing 22, arm 32, or both include attachment structures 29 comprising clamps, brackets, mateable structures such as threads, rail and groove structures. For example, the arm 32 or retainer housing 22 may include a latch that may be latched to a tab or other projection of the corresponding arm 32 or retainer housing 22. In the illustrated embodiment, the container 25 and arm 32 attach via attachment structures 29 comprising mateable threads along interfacing surfaces of the container 25, along the exterior of the base 40, and arm 32.

While the container 25 is illustrated as having a circular cross-section, in some embodiments, the container 25 may have other cross-section shapes, such as triangular, square, rectangle, multi-sided geometric, non-geometric, or free form.

The container 25 may comprise various interior volume 26 dimensions defined by sidewall 27, which may include a multi-sided sidewall. For example, the interior volume 26 may have a cross-section dimension between about 2 cm and about 10 cm, such as between about 3 cm and about 8 cm, between about 4 cm and about 6 cm. Larger or smaller dimensions may be used to accommodate different size vials 10. In the illustrated embodiment, the interior volume 26 is defined by sidewall 27 including a cross-section dimension of between about 4.5 cm and about 5 cm. The container 25 includes a circular cross-section defined by sidewall 27 that is slightly larger, e.g., about 2 mm to about 1.5 cm, than that of the vial 10. For example, all or a portion of sides of the vial 10 may be positioned spaced apart from sidewall 27 of the container 25 when received within the interior volume 26 of the container 25. However, in other embodiments, a large gap, e.g., a container 25 having an interior cross-section greater than about 1.5 cm than that of the vial 10, or a snug fit, e.g., a container 25 having an interior cross-section less than about 2 mm or less than about 1 mm of that of the vial 10, may be present between the sidewall 27,12 of the container 25 and vial 10 when the vial 10 is received within the interior volume 26 of the container 25. If a large gap is present, the gap should not be sufficient to allow the vial 10 to fall onto its side, e.g., the diameter of the interior volume 26 between the lateral side 27 of the container 25 should not be greater than the height of the vial 10. Preferably, the gap is not large enough to allow the vial 10 to tip such that the cap 15 of the vial 10 strikes or contacts lateral sides 27 of the container 25. In some embodiments, a spacer may be positioned within the interior volume 26 of the container 25 to limit movement extent the vial 10 may move between the sidewall 27.

While, in some embodiments, the height of the interior volume 26 of the container 25 that extends between the base 40 and cap 28 of the container 25 is less than that of the vial 10, the height of the interior volume 26 of the container 25 will typically be greater than that of the vial 10. In various embodiments, the container 25 may comprise a height between about 5 cm and about 20 cm, such as between about 6 cm and about 18 cm, between about 8 cm and about 15 cm, or about 10 cm and about 12 cm. Containers 25 having greater or lesser heights may be used, for example, to accommodate shorter, taller, or multiple vials 10. When the height of the vial 10 is greater than that of the container 25, a retaining device may be used to prevent the vial 10 from exiting the container 25 during powderizing operations. For example, a collared cap defining an orifice through which an upper portion or neck of the vial 10 may be extended with posited within the interior volume 26 of the container 25 may be secured to the upper rim of the container 25. In the illustrated embodiment, the container 25 height defined between the base 40 and cap 28 is between about 9 cm and about 10.5 cm.

When operated in the vertical orientation shown, gravity prevents the vial 10 from moving vertically in a manner that would cause the cap 15 of the vial 10 to strike the cap 28 of the container 25 during application of the oscillating rotational vortex motion. Thus, in some embodiments, the cap 28 of the container 25 may be omitted. However, the cap 25 may be utilized to ensure the vial 10 remains within the container 25 during the shaking operations. As noted above, in other embodiments, the interior volume 26 of the container 25 may be dimensioned to closely correspond with that of the height of the vial 10 or spacers, such as fittings, may be used between the cap 15, shoulders 13, sidewall 12, and/or base 11 to securely set off the vial 10 from the sides of the container 25 during operation of the shaker device 20.

Further to the above, in various embodiments, a method for powderizing a dry cake pharmaceutical drug product for injection within a vial 10 includes shaking the vial 10 with a shaker device 20. In some examples, the shaker device 20 may be a vortex mixer 20*a,* such as a benchtop vortex mixer (see, e.g., FIG. 2). To powderize the dry cake within the vial, the shaker device 20 may shake the vial 10 between about 1 and about 5000 cpm (or rpm), such as about 500 cpm, about 1000 cpm, about 1500 cpm, about 2000 cpm, about 2500 cpm, about 3000 cpm, about 3200 cpm, about 3500 cpm, about 4000 cpm, about 4500 cpm, about 5000 cpm, between about 500 cpm and about 5000 cpm, between about 1000 cpm and about 5000 cpm, between about 2000 cpm and about 5000 cpm, between about 3000 cpm and about 5000 cpm, between about 4000 cpm and about 5000 cpm, between about 1000 cpm and about 2000 cpm, between about 1000 cpm and about 3000 cpm, between about 1000 cpm and about 4000 cpm, between about 2000 cpm and about 3000 cpm, between about 2000 cpm and about 4000 cpm, between about 2000 cpm and about 5000 cpm, between about 3000 cpm and about 4000 cpm, between about 3000 cpm and about 5000 cpm, between about 4000 cpm and about 5000 cpm, greater than 1000 cpm, greater than 2000 cpm, greater than 3000 cpm, greater than 4000 cpm, or greater than 4500 cpm. In another example, the shaker device 20 may be operated at greater than 5000 cpm, such as about 6000 cpm or about 7000 cpm. In some embodiments, the shaker device 20 may shake the vial 10 for an above period of time to obtain an above particle size distribution at about 1000 cpm or less, about 1500 cpm or less, about 2000 cpm or less, about 2500 cpm or less, about 3000 cpm or less, about 3500 cpm or less, about 4000 cpm or less, about 4500 cpm or less, about 5000 cpm or less, at about 6000 cpm or less, or at about 7000 cpm or less.

The duration of the shaking operation may be one that obtains a desired particle size or range at the operation setting. For example, a vial may be shaken at an above cycle per minute or range thereof for between about 3 minutes and about 1 hour, between about 5 minutes and about 1 hour, between about 5 minutes and about 30 minutes, between about 5 minutes and about 20 minutes, between about 5 minutes and about 15 minutes, between about 5 minutes about 12 minutes, between about 5 minutes and about 10 minutes, between about 5 minutes and about 8 minutes, between about 8 minutes about 20 minutes, between about 8 minutes and about 15 minutes, between about 8 minutes and about 10 minutes, between about 10 minutes and about 20 minutes, between about 10 minutes and about 15 minutes, between about 10 minutes and about 12 minutes, or between about 12 minutes and about 20 minutes. In another example, the vial may be shaken at an above cycle per minute or range thereof for about 1 hour or less, about 50 minutes or less, about 40 minutes or less, about 30 minutes or less, about 25 minutes or less, about 20 minutes or less, about 18 minutes or less, about 15 minutes or less, about 12 minutes or less, about 10 minutes or less, about 8 minutes or less, or about 5 minutes or less. The duration and cycles per minute of the shaking operation may be one that obtains a desired particle size or range at the operation setting.

In various embodiments, the above shaking operation times and cycles per minute may be used to reduce the dry cake 18 to powder wherein a majority of the particles have a particle size of less than or about 100 um, about 90 um, about 80 um, about 70 um, about 60 um, about 50 um, about 40 um, about 30 um, about 20 um, about 10 um, about 5 um, between about 2 um and about 60 um, between about 4 um and about 54 um, between about 6 um and about 50 um, between about 8 um and about 38 um, or about 9 um and about 28 um. For example, the above shaking operation times and cycles per minute may be used to reduce the dry cake 18 to powder wherein at least about 90%, about 95%, or about 99% of the particles have a particle size of less than or about 100 um, about 90 um, about 80 um, about 70 um, about 60 um, about 50 um, about 40 um, about 30 um, about 20 um, about 10 um, about 5 um, between about 1 um and about 80 um, between about 2 um and about 58 um, between about 2 um and about 54 um, between about 2 um and about 50 um, between about 2 um and about 45 um, or about 2 um and about 40 um.

While longer shaking times and higher cycles per minute may be used, vials may typically be shaken at between about 2500 cpm and about 5000 cpm for between about 8 minutes and about 20 minutes, such as between about 8 minutes and about 15 minutes, to obtain particle sizes less than or about 100 microns, e.g., wherein a majority of the particles following shaking have a particle size of about 100 um or less, about 90 um or less, about 80 um or less, about 70 um or less, about 60 um or less, about 50 um or less, about 40 um or less, about 30 um or less, about 20 um or less, about 10 um or less, or about 5 um or less. In some embodiments, about 90%, about 95%, or about 95% of the particles may fall within the above particle sizes. In a further example, the average particle size may be between about 20 um and about 80 um, between about 20 um and about 60 um, between about 15 um and about 50 um, between about 10 um and about 40 um, or between about 5 um and about 30 um.

FIGS. 4 & 5 illustrate particle size data obtained from performing a shaking operation with a shaker device and retainer housing similar to that described above with respect to FIG. 2. Specifically, a Voriconazole for injection vial, 200 mg, was positioned in the container mounted to a Benchmark Scientific BV1000 BenchMixer having an arm orbit of 3 mm and shaken at about 3200 cpm for about 10 minutes. Particle sizes of the volume of powder obtained was determined using a Malvern Mastisizer 3000, manufactured by Malvern Panalytical, Malvern, UK, wherein 0.5 g of the resulting powder was dispersed in 20 mL of mineral spirits and sonicated for 3 minutes prior to analysis. FIG. 4 shows percent particle size representation in the powder while FIG. 5 shows percentages of particle sizes represented in the powder below listed particle sizes.

In one example, the vial may be shaken at between about 1000 cpm and about 7000 cpm for about 7 minutes or longer, such as between about 8 minutes and about 20 minutes or a time period therebetween wherein the average particle size of the powder obtained is between 7 um and about 50 um, such as between about 10 um and about 40 um, or 90%, 95%, or 99% of the particles are about 100 um or less, such as about 80 um or less, about 60 um or less, about 50 um or less, about 40 um or less, or about 30 um or less. In another example, the vial may be shaken at between about 2000 cpm and about 5000 cpm for about 7 minutes or longer, such as between about 8 minutes and about 20 minutes or a time period therebetween wherein the average particle size of the powder obtained is between 7 um and about 50 um, such as between about 10 um and about 40 um, or 90%, 95%, or 99% of the particles are about 100 um or less, such as about 80 um or less, about 60 um or less, about 50 um or less, about 40 um or less, or about 30 um or less. In another example, the vial may be shaken at between about 3000 cpm and about 4000 cpm for about 7 minutes or longer, such as between about 8 minutes and about 20 minutes or a time period therebetween wherein the average particle size of the powder obtained is between 7 um and about 50 um, such as between about 10 um and about 40 um, or 90%, 95%, or 99% of the particles are about 100 um or less, such as about 80 um or less, about 60 um or less, about 50 um or less, about 40 um or less, or about 30 um or less. In another example, the vial may be shaken at between about 3000 cpm and about 4000 cpm for about 7 minutes or longer, such as between about 8 minutes and about 15 minutes or a time period therebetween wherein the average particle size of the powder obtained is between 7 um and about 50 um, such as between about 10 um and about 40 um, or 90%, 95%, or 99% of the particles are about 100 um or less, such as about 80 um or less, about 60 um or less, about 50 um or less, about 40 um or less, or about 30 um or less.

The dry cake drug product contained in the vial may be a drug product for injection, such as an antifungal, antibiotic, or antiviral, e.g., amphotericin B, voriconazole, colistimethate, vancomycin, streptomycin, acyclovir, remdesivir, or ganciclovir.

As introduced above, in various embodiments, the dry cake drug product for injection retained within the vial for application of the herein described powderization methods includes a lyophilized dry drug product for injection such as an antifungal, antibiotic, or antiviral, such as amphotericin B, voriconazole, colistimethate, vancomycin, streptomycin, acyclovir, remdesivir, or ganciclovir. Accordingly, the method may include positioning a vial containing a lyophilized dry drug product for injection into the container and shaking with the shaker device according to any methodology described herein to powderized the drug product wherein the dry drug product is an antifungal, antibiotic, or antiviral, such as amphotericin B, voriconazole, colistimethate, vancomycin, streptomycin, acyclovir, remdesivir, or ganciclovir An example amphotericin dry drug product to which the present powderization methodologies may be applied is Amphotericin B for Injection, USP, 50 mg, XGen Pharmaceuticals DJB, Inc. Horseheads, NY, wherein each vial contains 50 mg amphotericin, 41 mg sodium desoxycholate, buffered with 20.2 mg sodium phosphates (mono and dibasic sodium phosphate, phosphoric acid, and sodium hydroxide) in lyophilized dry cake form.

An example voriconazole dry drug product to which the present powderization methodologies may be applied is Voriconazole for Injection, 200 mg, XGen Pharmaceuticals DJB, Inc. Horseheads, NY, wherein each vial contains 200 mg voriconazole and 3200 mg hydroxypropylbetadex in lyophilized dry cake form.

An example streptomycin dry drug product to which the present powderization methodologies may be applied is Streptomycin for Injection USP, 1 g, XGen Pharmaceuticals DJB, Inc. Horseheads, NY, wherein each vial contains streptomycin sulfate, USP, equivalent to 1 g streptomycin, in lyophilized dry cake form.

An example colistimethate dry drug product to which the present powderization methodologies may be applied is Colistimethate for Injection, USP, 150 mg, Xellia Pharmaceuticals USA, LLC, Buffalo Grove, IL, wherein each vial contains colistimethate sodium or pentasodium colistinmethanesulfonate (150 mg colistin base activity) in lyophilized dry cake form.

Example vancomycin dry drug products to which the present powderization methodologies may be applied include Vancomycin Hydrochloride for Injection, USP, 500 mg, 1 g, Xellia Pharmaceuticals USA, LLC, Buffalo Grove, IL, wherein each vial contains vancomycin hydrochloride equivalent to 500 mg, 1 g, or 10 g vancomycin base, respectively, in lyophilized dry cake form.

The herein described methods may be applied to other antimicrobials as well as other dry cake drug products for injection in vials.

The methods described herein may be utilized without opening a vial or adding substances to the dry cake drug product such as liquids and thus may be utilized to powderize the dry drug product contents without contaminating or disturbing a sterile seal of the vial. The resulting powder may be utilized for pharmaceutical compounding, thereby rendering the compounding process simpler by powderizing the dry drug product contents. As the methods allow powderization to maintain the sterile seal, the generated powder may be maintained in such a state for long periods of time. Even if the seal is broken prior to, during, or subsequently, portions of the powder contents may be quickly and precisely removed, limiting contamination opportunities compared to dissolving the dry cake or crushing, grinding, or breaking the dry cake in a blender within or outside the vial 10. The powderized dry drug product may be easier to dispense to patients or for compounding and to remove from the vial for other intended uses. In one embodiment, the method includes using the powderized dry drug product in an irrigation system. For example, the powderized dry drug product may be placed in an irrigation system such that it may be poured out of the vial rather than wedged inside the vial. In another embodiment, the powderized dry drug product may be poured directly on a wound. In a further embodiment, a wound care composition, such as Santyl (collagenase), may be applied to the wound on top of the powderized drug product.

Upon reading the present disclosure, those having skill in the art will appreciate that vials may be shaken in a shaker device as described herein at fewer cycles per minute and/or for less time as described herein to obtain larger particles that are small enough to be removed from the vial 10 and then further ground or broken-up to generate a powder having particle sizes described herein. Upon reading the present disclosure, those having skill in the art will also appreciate that longer durations of shaking at lower cycles per minute may be used to obtain similar particles sizes as shaking vials at higher cycles per minute for shorter periods of time. Such other methodologies utilizing vials tightly or loosely secured to a shaker device, e.g., within a container attached to the shaker device, as described herein are intended to be encompassed by the present disclosure.

The present disclosure may be embodied in other forms without departing from the spirit or essential attributes thereof and, accordingly, reference should be had to the following claims rather than the foregoing specification as indicating the scope of the invention. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular preferred arrangements disclosed for carrying out this invention, but that the invention will include all embodiments and arrangements falling within the scope of the appended claims.

Various elements described herein have been described as alternatives or alternative combinations, e.g., in a lists of selectable actives, ingredients, or compositions. It is to be appreciated that embodiments may include one, more, or all of any such elements. Thus, this description includes embodiments of all such elements independently and embodiments including such elements in all combinations.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

Any numerical range recited herein includes all values and ranges from the lower value to the upper value. For example, if a range is stated as 1 to 50, it is intended that values such as 2 to 40, 10 to 30, 1 to 3, or 2, 25, 39 and the like, are expressly enumerated in this specification. These are only examples of what is specifically intended, and all possible combinations of numerical values and ranges between and including the lowest value and the highest value enumerated are to be considered to be expressly stated in this application. Numbers modified by the term "approximately" or "about" are intended to include +/−10% of the number modified.

What is claimed is:

1. A method of powderizing a dry cake pharmaceutical drug product for injection within a vial, the method comprising:

securing a vial containing a dry cake pharmaceutical drug product for injection to a shaker device; and powderizing the dry cake pharmaceutical drug product for injection within the vial by shaking the vial with the shaker device operated at between about 100 to about 5000 cycles per minute for between about 10 minutes and about 1 hour.

2. The method of claim 1, further comprising maintaining a sterile seal under a cap of the vial during the powderization.

3. The method of claim 1, wherein the shaker device comprises a vortex mixer and the cycles per minute are revolutions per minute.

4. The method of claim 3, wherein securing the vial to the shaker device comprises positioning the vial within a retainer housing.

5. The method of claim 4, wherein the retainer housing comprises a container, and wherein positioning the vial within the retainer housing comprises positioning the vial within an interior volume of the container.

6. The method of claim 5, further comprising maintaining a sterile seal under a cap of the vial during the powderization.

7. The method of claim 5, wherein the container is removably attachable to an arm of the shaker device that outputs the shaking motion of the shaker device.

8. The method of claim 5, wherein the container includes a cap and the method includes securing the cap to the container before shaking the vial with the shaker device.

9. The method of claim 5, wherein the shaker device is operated at between about 2500 and about 5000 cycles per minute for between about 10 minutes and about 20 minutes.

10. The method of claim 1, wherein securing the vial to the shaker device comprises positioning the vial within a retainer housing, and wherein the retainer housing comprises a bracket configured to receive and secure the vial to the shaker device.

11. The method of claim 1, wherein the dry pharmaceutical drug product for injection is selected from amphotericin B, voriconazole, colistimethate, vancomycin, streptomycin, acyclovir, remdesivir, or ganciclovir.

12. A method of powderizing a dry cake pharmaceutical drug product for injection within a vial, the method comprising:

securing a vial containing a dry cake pharmaceutical drug product for injection to a vortex mixer; and powderizing the dry cake pharmaceutical drug product for injection within the vial by shaking the vial with the shaker device operated at between about 2500 to about 5000 revolutions per minute for between about 10 minutes and about 1 hour.

13. The method of claim 12, further comprising maintaining a sterile seal under a cap of the vial during the powderization.

14. The method of claim 13, wherein securing the vial to the shaker device comprises positioning the vial within a retainer housing, wherein the retainer housing comprises a container, wherein positioning the vial within the retainer housing comprises positioning the vial within an interior volume of the container, wherein the container is removably attachable to an arm of the shaker device that outputs the shaking motion of the shaker device, and wherein the container includes a cap and the method includes securing the cap to the container before shaking the vial with the shaker device.

15. The method of claim 14, wherein the dry pharmaceutical drug product for injection is selected from amphotericin B, voriconazole, colistimethate, vancomycin, streptomycin, acyclovir, remdesivir, or ganciclovir.

16. A method of powderizing a dry cake pharmaceutical drug product for injection within a vial, the method comprising:

securing a vial containing a dry cake pharmaceutical drug product for injection to a shaker device;

powderizing the dry cake pharmaceutical drug product for injection within the vial by shaking the vial with the shaker device operated at between about 2500 to about 5000 revolutions per minute for between about 10 minutes and about 1 hour; and maintaining a sterile seal under a cap of the vial during the powderization, wherein securing the vial to the shaker device comprises positioning the vial within a retainer housing, wherein the retainer housing comprises a container, wherein positioning the vial within the retainer housing comprises positioning the vial within an interior volume of the container, wherein the container is removably attachable to an arm of the shaker device that outputs the shaking motion of the shaker device, and wherein the container includes a cap and the method includes securing the cap to the container before shaking the vial with the shaker device.

17. The method of claim 16, wherein the dry pharmaceutical drug product for injection is selected from amphotericin B, voriconazole, colistimethate, vancomycin, streptomycin, acyclovir, remdesivir, or ganciclovir.

* * * * *